Patented May 3, 1949

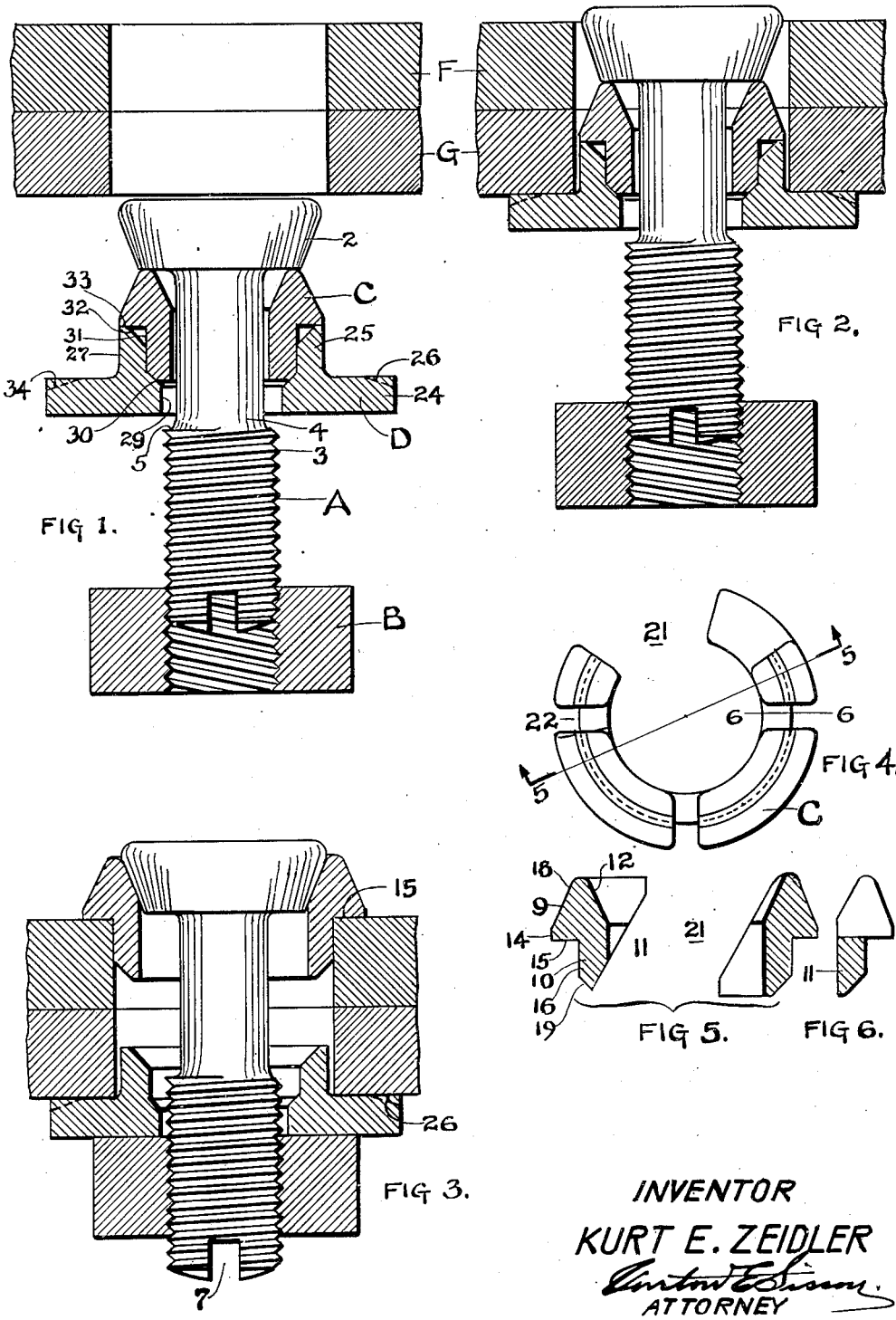

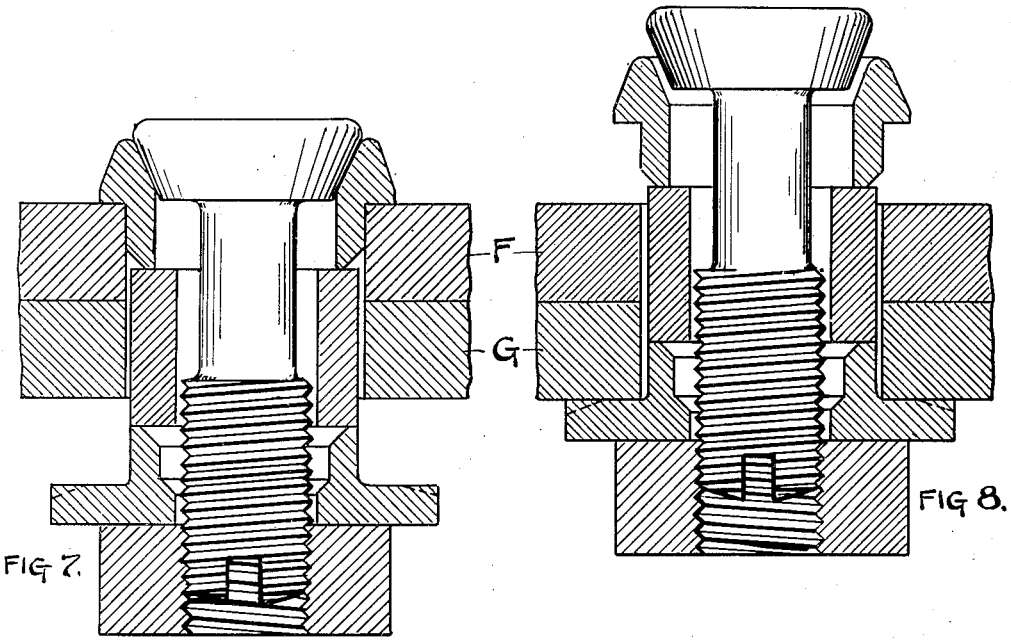
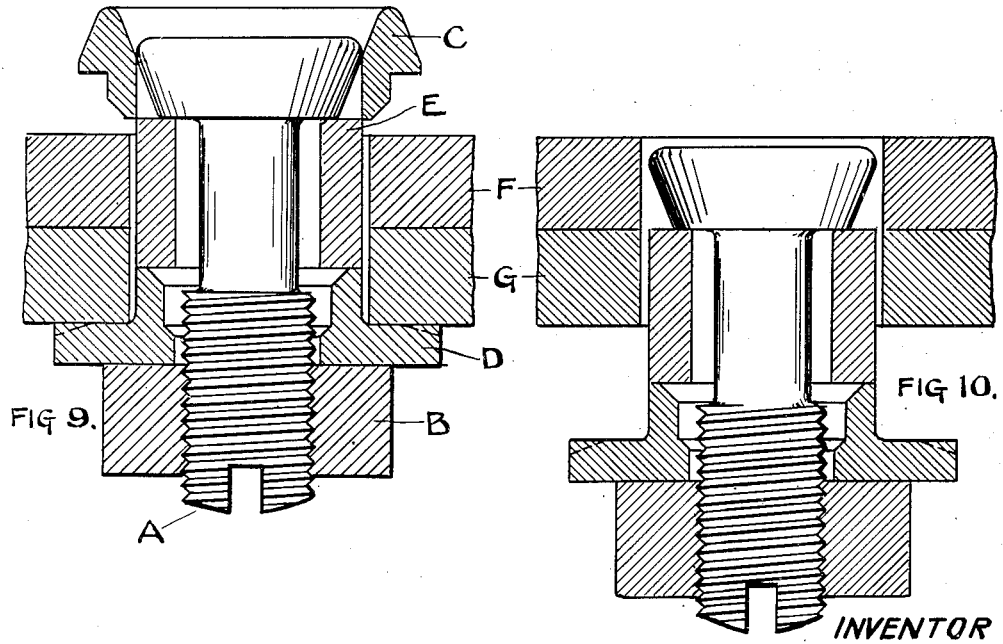

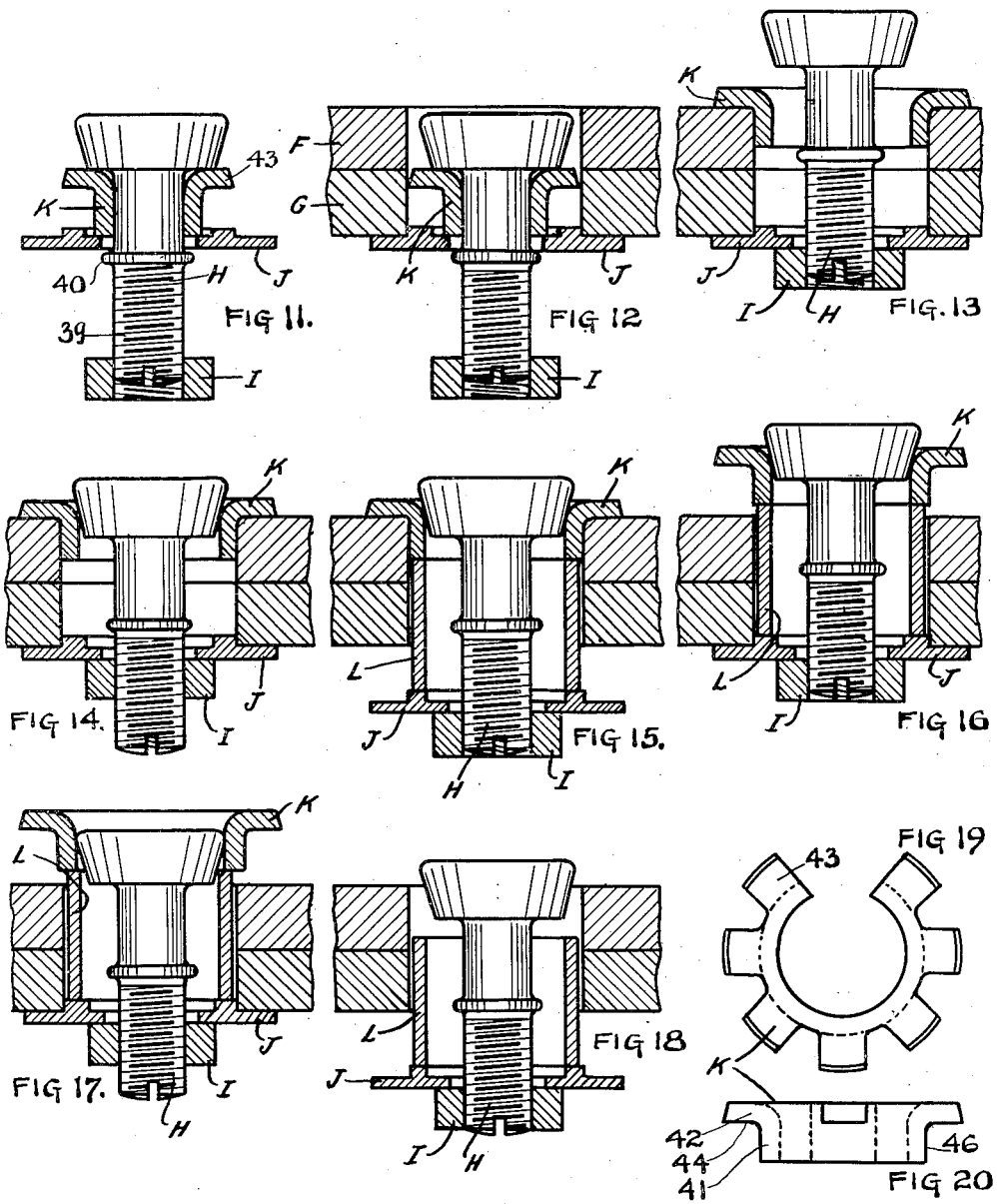

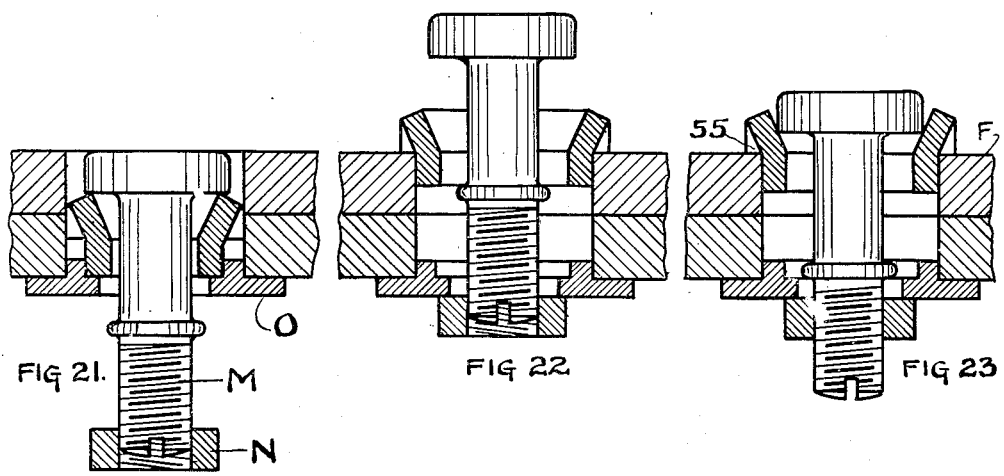
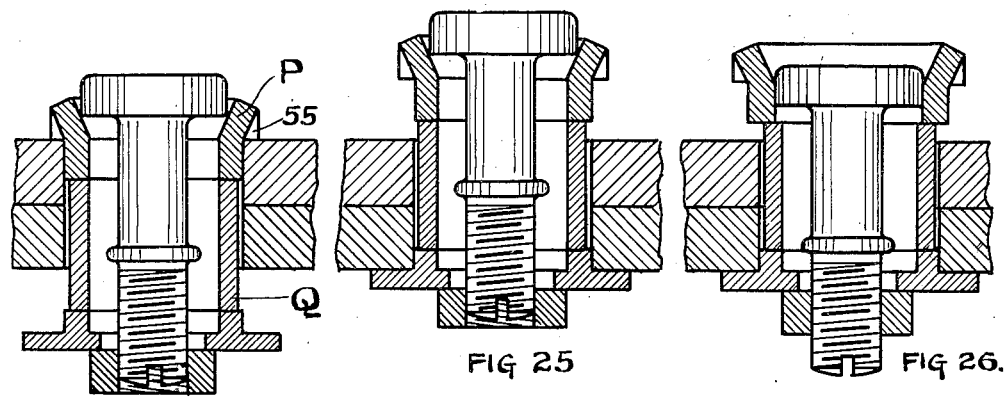
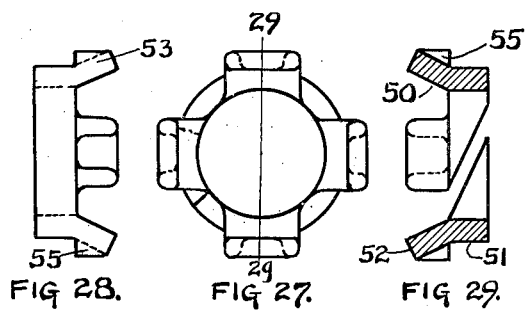

2,469,349

UNITED STATES PATENT OFFICE 2,469,349

BLIND BOLT DEVICE

Kurt E. Zeidler, Chicago, Ill.

Application March 4, 1946, Serial No. 651,790

7 Claims. (Cl. 85—2.4)

The device relates to means to secure two or more elements together, having registering apertures therein, and an object of the invention is to provide such a securing means which is operable for installation entirely from one side of such elements. Such devices are used when the opposite side of the elements is inaccessible and are generally called "blind bolts."

A further object is to provide such a device which is removable entirely from the same side of such elements from which it was installed and to do so without distorting or otherwise damaging the device so that it may be reused.

A further object is to provide such a device which can be installed without the use of any special tool or equipment other than the usual wrench and screw driver.

In the drawings:

Figures 1, 2 and 3 show the installation of the device wherein—

Figure 1 shows the device about to be installed.

Figure 2 shows the device partially installed.

Figure 3 shows the device completely installed.

Figures 4, 5 and 6 show the split spring washer wherein—

Figure 4 is a plan view.

Figure 5 is a section on line 5—5 of Figure 4.

Figure 6 is a section on line 6—6 of Figure 4.

Figures 7, 8, 9 and 10 show the method of removing the device wherein—

Figure 7 shows the removing sleeve inserted between the spring washer and the retainer.

Figure 8 shows the spring washer disengaged from the elements which were secured together.

Figure 9 shows the spring washer opened up by the bolt head.

Figure 10 shows the bolt head pulled entirely through the spring washer. (The spring washer having fallen away.)

Figures 11 to 20 inclusive show a modified construction wherein—

Figure 11 shows the device assembled and ready to be installed within the apertures in the elements to be secured together.

Figure 12 shows the device about to be installed.

Figure 13 shows the device partially installed.

Figure 14 shows the device completely installed.

Figures 15, 16 and 17 show the removal of the device wherein—

Figure 15 shows the removing sleeve inserted between the spring washer and the retainer.

Figure 16 shows the spring washer disengaged from the elements which were secured together.

Figure 17 shows the bolt head pulled partially through the spring washer.

Figure 18 shows the bolt head pulled entirely through the spring washer wherein the spring washer has disappeared.

Figures 19 and 20 show a modified split spring washer.

Figures 21 to 29 inclusive show another modified construction wherein—

Figures 21 and 22 show the device partially installed.

Figure 23 shows the device completely installed.

Figures 24, 25 and 26 show the method of removing the device wherein—

Figure 24 shows the removing sleeve inserted between the spring washer and the retainer.

Figure 25 shows the spring washer disengaged from the elements which were secured together.

Figure 26 shows the bolt head partially pulled through the spring washer.

Figures 27, 28 and 29 show the spring washer of this modification in detail wherein—

Figure 27 is a plan view.

Figure 28 is a side elevation.

Figure 29 is a section on line 29—29 of Figure 27.

The device is described as being in a vertical position for simplification of description, it being understood, however, that the bolt may be applied in any direction and still come within the scope of the invention.

While I have described component parts of the device as having diameters, these elements may be other than round, and still come within the scope of the invention. I prefer these elements to be round so that the device may be installed without particular reference to the positions of the parts of the device around the longitudinal axis of the bolt, for simplification of installation and removal of the device and manufacture.

The device comprises a bolt A, nut B, spring washer C, retainer D, sleeve E to hold elements F and G together.

In the form of the device shown in Figures 1 to 10 inclusive the bolt A is formed with a head 2 small enough to pass through the apertures in the elements; a shank having the end portion 3 of larger diameter than the intermediate portion 4, thus forming a shoulder 5 therebetween. The end portion 3 of the bolt is threaded to take the nut B and is also provided with a screw driver slot 7 in the end thereof. The head has the opposite sides thereof converging toward the shank of the bolt and is preferably of truncated cone shape.

Figures 4, 5 and 6 show the spring washer of this modification. The spring washer C is made of spring steel or other resilient material. The upper part 9 and the lower part 10 have a common inside diameter 11, though the upper part 12 of the inside diameter is upwardly and outwardly inclined. The outside diameter 14 of the upper part 9 is greater than the outside diameter of the lower part 10 so that the lower surface 15 of the upper part and the outside perimeter 16 of the lower part form, in effect, a continuous recess around the spring washer. When the device is in assembled operative position, as shown in Figure 3, the outer surface 16 of the lower part of the spring washer engages the wall of one of said apertures to stabilize the device. The upper part 9 is provided with inner and outer converging preferably circular inclined surfaces 18. The lower portion 10 of the lower part is provided with a circular chamfered guiding edge 19.

The spring washer is a split washer with the opening 21 forming the split positioned on a bias to the plane of the washer so as to be applied to the shank of the bolt A while diagonally disposed and so that the spring washer C cannot become disengaged from the shank 4 while being held in substantially horizontal position by the head 2 of the bolt A, retainer D or sleeve E, as the case may be. The opening 21 forming the split is not shown in the assembled drawing to avoid confusion. To provide greater resiliency to the washer I preferably form the upper part 9 of the spring washer C with slots 22 to provide interruptions therein. The lower part, however, is not interrupted by these slots, as shown in Figure 6.

The normal position, i. e., diameter of the spring washer, is as shown in Figures 3, 7 and 8 but it is capable of being compressed to the diameter shown in Figure 1 or expanded to the diameter shown in Figure 9.

The retainer D has a lower part 24 with a larger outside diameter than the upper part 25 thereof (hereinafter called a flange) to provide a horizontal bearing surface 26 therebetween and also to provide a shoulder 27 for engagement with the side of one of said apertures to stabilize the device when in assembled operative position.

The aperture through the retainer D comprises a lower circular vertical surface 29 merging into an upwardly and outwardly inclined bearing surface 30 merging into a vertical engaging surface 31, merging into an upwardly and outwardly guiding surface 32 forming a blunt edge 33 at the top of the retainer D.

The outer side of the retainer may be provided with spaced notches 34 for the insertion of a tool (not shown) to force the retainer D away from the element G if necessary.

The sleeve E (as shown in Figs. 7 through 10) is a cylinder having an outside diameter slightly less than the inside diameter of the apertures in the elements F and G and having an inside diameter slightly greater than the outside diameter of the shoulder 5 of the bolt. The sleeve E does not necessarily form a complete circle; in fact, any member which is engageable with the retainer D and spring washer C on opposite sides of the bolt would suffice—though, for efficiency, I prefer a sleeve forming substantially a complete circle.

Application of the device

In the drawing F and G represent two elements which are to be secured together and which are provided with registering apertures. The elements are assumed to be accessible from one side only, i. e., the lower side of the drawing.

Figure 1 shows the device assembled and in position to be moved upwardly through the apertures in the elements F and G. The spring washer C has been placed around the smaller shank 4 of the bolt A by inserting the smaller shank through the opening 21 forming the split in the spring washer C. The spring washer is then compressed (reduced in diameter) and inserted in the retainer D. The retainer holds the spring washer compressed until it is released as hereinafter described. The larger shank 3 has been passed through the retainer D and the nut B threaded into engagement with the bolt A. I contemplate furnishing the device thus assembled.

Figure 2 shows the device partially in the apertures and the retainer D in engagement with the element G around the aperture therein, thus limiting the movement of the retainer and preventing the device from passing through the apertures in the elements and being lost. Note that the nut B is not completely in engagement with the bolt A. The device is then forced upwardly (by hitting the nut with a hammer or otherwise) until the shoulders 5 on the bolt A engage the lower surface of the spring washer C. Further upward movement of the bolt A forces the spring washer C out of engagement with the retainer D, whereupon the outer side 14 of the spring washer C rides upon the sides of the apertures until the outer side of the spring washer passes the upper surface of the element F when the washer springs outwardly to the position shown in Figure 3. The nut B is then drawn up until the shoulder 15 of the spring washer tightly engages the upper surface of the element F and the shoulder 26 of the retainer tightly engages the lower surface of the element G, all as shown in Figure 3. The device is now in assembled position and is securely holding elements F and G together.

Removal of device

Figure 3 shows the device in operative position. When it is desired to remove the device from the apertures in elements F and G the nut B and retainer D are removed (by inserting a screw driver in the slot 34, if necessary) then the sleeve E is passed over the bolt A until it engages the spring washer C and then the retainer D and nut B are put in place and the nut is drawn up until the sleeve E is in contact with both the retainer D and the spring washer C, all as shown in Figure 7.

The bolt A is then forced upwardly whereupon the force exerted through the nut B, retainer D and sleeve E forces the spring washer C out of the apertures in the elements F and G. The spring washer being in its normal state neither contracts nor expands when it reaches this position. (See Figure 8.) The length of the bolt A and the length of the sleeve E, of course, are determined by the combined thickness of elements F and G so that by the time the spring washer is out of the apertures in the elements F and G, the retainer D is in engagement with the lower surface of the element G, all as shown in Figure 8.

The nut is then drawn up on the bolt which pulls the truncated cone head 2 of the bolt through the spring washer C, thus spreading the spring washer until the head has passed the inclined surfaces 12 in the upper part of the spring washer and has reached the vertical surface 11 of the lower part of the spring washer, all as shown in Figure 9. The bolt is then free to pass through the apertures in the elements F and G. The retainer is then pried, or otherwise moved, away from the element G and the spring washer drops (anywhere) out of the way and is lost, all as shown in Figure 10.

The device is then disassembled, the sleeve E is removed; another spring washer is put in place and the same nut B and retainer D put in place on the bolt so that the assembled device is then as shown in Figure 1 and is ready for reuse.

Figures 11 to 20 inclusive show a modification comprising a bolt H, nut I, retainer J, spring washer K and sleeve L.

In this modification the head is truncated to provide converging walls to spread the spring washer when the device is being removed from the elements F and G. The shank 39 of the bolt H is of constant diameter and the shoulder 40 is provided by upsetting it from the shank or by welding or shrinking a band on the shank. The split spring washer K is as shown in Figures 19 and 20, wherein the lower part 41 comprises a metallic band forming almost a complete circle and the upper part 42 comprises a plurality of preferably spaced apart wings 43 extending outwardly from the upper margin of the lower part 41 around the perimeter of the lower part. The lower surfaces of these wings engage the upper surface of the element F when the device is in operative position, as shown in Figure 14.

In this modification the normal condition of the spring washer K is as shown in Figures 13 to 16 inclusive, wherein the diameter 46 of the lower part 41 thereof is substantially the same as the diameters in the elements F and G. The sleeve L is substantially of a length equal to the combined thickness of the elements F and G which are secured together so that the length of sleeve required can readily be determined in each case. The device as shown in Figures 11 to 20 inclusive operates both upon installation or removal substantially as heretofore described for the design shown in Figures 1 to 10 inclusive.

Figures 21 to 29 inclusive show another modification comprising a bolt M, nut N, retainer O, spring washer P and sleeve Q.

In this modification the spring washer P is provided with converging walls 50 (instead of the head of the bolt, as shown in Figures 11 to 20 inclusive) to spread the spring washer P when the device is being removed from the elements F and G. The split spring washer P, as shown in Figures 27, 28 and 29, comprises a lower part 51 forming almost a complete circle and the upper part 52 comprises a plurality of preferably spaced apart wings 53 having upwardly and outwardly positioned surfaces 50 engageable with the head of the bolt as the nut is drawn up to spread the spring washer, as shown particularly in Figures 25 and 26. The head of the bolt is preferably round so as to be engageable with four or more of such wings to stabilize the bolt as it is being pulled through the washer. Each wing is provided with one or more braces 55 which bear against element F (as shown in Figure 23) to prevent the wings from being bent out of shape when the pressure is being exerted on the head and spring washer by the nut.

The device as shown in Figures 11 to 20 inclusive and the device as shown in Figures 21 to 29 inclusive each operate upon installation or removal substantially as heretofore described for the designs shown in Figures 1 to 10 inclusive.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim.

1. A device for securing two elements together having registering apertures therein operable entirely from one side of said elements; said device comprising a bolt having a head, the shank of said bolt having a shoulder spaced from said head, a nut having a threaded engagement with the end of the shank, a split spring washer surrounding the shank of the bolt between said head and said shoulder, said spring having an upper part normally having an outside diameter larger than said apertures and an inside diameter normally smaller than the head of the bolt, said spring washer also having a lower part normally having an outside diameter substantially the same as said apertures and an inside diameter normally smaller than the head of the bolt, and a retainer surrounding said shank between said nut and said head which is larger than said apertures and is provided with a hole therethrough larger than said shoulder, said elements associated and arranged so that as the head of the bolt moves through said apertures when applying the device to said elements the spring washer is held under compression until said shoulder pushes the upper part of the spring washer out of engagement with the sides of the apertures, whereupon said retainer engages one of said elements adjacent the aperture therein and prevents further movement of the bolt, with its associated nut, and whereupon the compression of the spring washer is released and the spring washer opens up until the lower part thereof is engageable with the side of one of said apertures and the upper part thereof is engageable with the outer surface of the other of said elements and so that upon drawing up the nut on said shank the upper part of the spring washer is forced against said outer surface and the lower part of the spring washer is forced against the side of the adjacent element and so that said elements are drawn together between the spring washer and retainer by the head and the nut thereby securing the elements together.

2. A structure as defined in claim 1 wherein the device includes means to disengage said device from said elements, said means comprising a member adapted to be positioned within said apertures with the ends thereof engaging the spring washer and retainer, respectively, without removing the bolt and spring washer from the elements whereupon a bodily movement of said bolt, spreader and member in one direction causes the member to force the lower part of the spring washer out of the apertures and also forces the flange of the retainer into engagement with one of said elements whereupon drawing up of the nut upon said shank causes the converging sides of the bolt head to spread the washer until the bolt head passes through the washer while said member holds the spring washer out of said apertures and whereupon the device, minus the spring washer, may be removed through the apertures.

3. A device as defined in claim 1 wherein the retainer is provided with means engageable with the spring washer to hold the spring washer in compressed position out of engagement with the sides of the apertures as the spring washer enters the apertures.

4. A device as defined in claim 1 wherein the retainer is provided with a recess engageable with the lower part of the spring washer to hold the spring washer in compressed position out of engagement with the sides of the apertures as the spring washer enters the apertures.

5. A device for securing two elements together having registering apertures therein operable entirely from one side of said elements, said device comprising a bolt having a truncated cone head with the sides thereof converging toward the shank of the bolt, and a shank with the intermediate portion thereof smaller in diameter than the end portion thereof to form a shoulder therebetween, a nut having threaded engagement with the end of said shank, a split spring washer surrounding said shank positioned between said head and said shoulder, said spring washer having an upper part normally of larger diameter than said apertures and a lower part normally of substantially the same diameter of said apertures, the outer sides of said upper part converging upwardly, and a retainer having a flange of greater diameter than the diameter of said apertures, whereby the head of the bolt and the spring washer, while under compression, may be moved into said apertures until said flange engages one of said elements, the walls of said apertures compressing the upper part of the spring washer to the diameter of the apertures and whereby upon further movement of said bolt said shoulder pushes the said upper part of the spring washer out of the apertures and the compression thereof is released so that the spring washer opens up until the lower part thereof engages the walls of one of said apertures and a movement of said bolt in the opposite direction forces the upper end of the spring washer into engagement with one of said elements and also forces the flange of the retainer into engagement with the other of said elements thereby holding said elements together.

6. A device for securing two elements together having registering apertures therein operable entirely from one side of said elements, said device comprising a bolt having a truncated cone head with the sides thereof converging toward the shank of the bolt, and a shank with the intermediate portion thereof smaller in diameter than the end portion thereof to form a shoulder therebetween, a nut having threaded engagement with the end of said shank, a split spring washer surrounding said shank positioned between said head and said shoulder, said spring washer having an upper part normally of larger diameter than said apertures and a lower part normally of substantially the same diameter of said apertures, and a retainer having means to confine said spring washer in a compressed position so that the diameter of said upper part is substantially the same as the apertures while the spring washer is being inserted in one of said apertures, said retainer having a flange of greater diameter than the diameter of said apertures, whereby the head of the bolt and the spring washer, while under compression may be moved into said apertures until said flange engages one of said elements and whereby upon further movement of said bolt said shoulder pushes the spring washer out of confinement with said retainer whereupon the spring washer is held under compression by the upper parts thereof engaging the wall of said apertures and further movement of the bolt pushes the said upper part of the spring washer out of the apertures and the compression thereof is released so that the spring washer opens up until the lower part thereof engages the walls of one of said apertures and a movement of said bolt in the opposite direction forces the upper end of the spring washer into engagement with one of said elements and also forces the flange of the retainer into engagement with the other of said elements thereby holding said elements together.

7. A device for securing together two elements having registering apertures therein, said device comprising a bolt having a head and a shank, said shank provided with an annular shoulder spaced from said head, a split spring washer surrounding said shank between said head and shoulder, said spring washer having an upper part normally of larger outside diameter than said apertures and of lesser inside diameter than said bolt head, and a lower part normally of substantially the same outside diameter of said apertures, a nut having a screw threaded engagement with said bolt, and a retainer upon said bolt, between said shoulder and said nut, said retainer having a tubular part of substantially the same outside diameter as said apertures and a flange of larger diameter than said apertures, said retainer provided with a recess adapted to receive and hold the lower part of said washer when compressed so that said head and upper part of said washer may be passed through said apertures when said shoulder may force the washer from said retainer allowing said washer to be released and the lower part to engage the walls of said apertures, and when a tightening of said nut will draw the bolt head against said washer causing it to engage one of said elements and the nut will cause the retainer to engage the other of said elements, thereby holding said elements together.

KURT E. ZEIDLER.

REFERENCES CITED

The following references are of record in the file of this patent:

UNITED STATES PATENTS

| Number | Name | Date |
|---|---|---|
| 1,561,880 | Morrison et al. | Nov. 17, 1925 |
| 1,767,316 | Sealey | June 24, 1930 |

FOREIGN PATENTS

| Number | Country | Date |
|---|---|---|
| 356,455 | Germany | July 21, 1922 |
| 684,397 | Germany | Nov. 27, 1939 |